Figure 4:
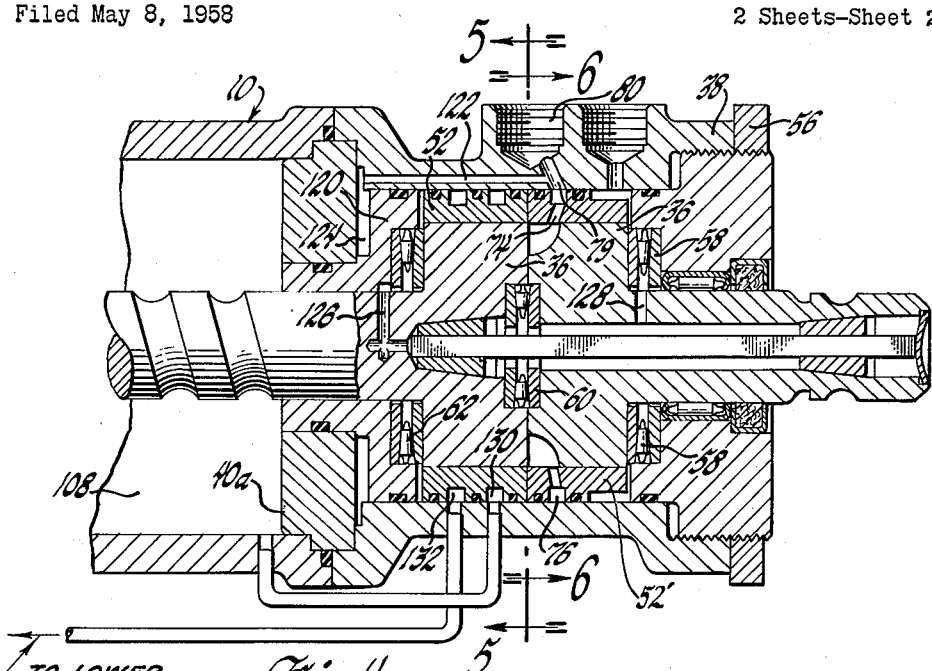

June 13, 1961 PAUL V. WYSONG, JR 2,988,059
FLUID POWER STEERING CONTROL VALVE
Filed May 8, 1958 2 Sheets-Sheet 1
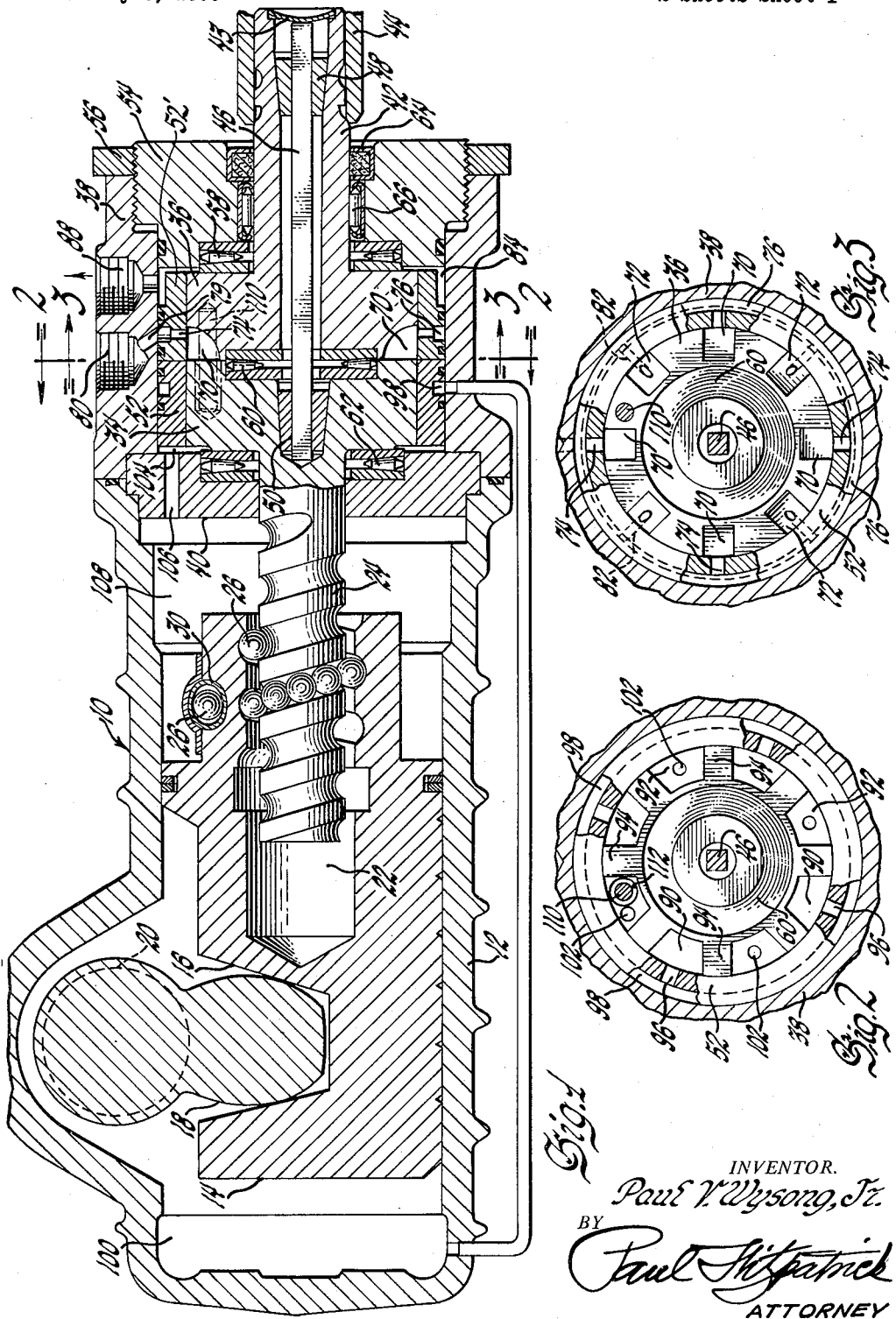
INVENTOR.
Paul V. Wysong, Jr.
BY
Paul Fitzpatrick
ATTORNEY

TO LOWER
CHAMBER
OF MOTOR

INVENTOR.
Paul V. Wysong, Jr.
BY
Paul Kilpatrick
ATTORNEY

United States Patent Office

2,988,059
Patented June 13, 1961

2,988,059
FLUID POWER STEERING CONTROL VALVE
Paul V. Wysong, Jr., Saginaw, Mich., assignor to General Motors Corporation, Detroit, Mich., a corporation of Delaware
Filed May 8, 1958, Ser. No. 733,876
10 Claims. (Cl. 121—41)

This invention relates to a fluid-operated servo mechanism and in its most specific aspect concerns a hydraulic power steering gear incorporating a control valve of unique construction and operation.

Due to the growing number of accessory devices demanding the use of components which, for economic and other practical reasons, must be located under the engine hood or bonnet in proximity to the engine and due further to body design trends which dictate a low silhouette with a flat hood, the space available in the engine compartment of the present-day automobile is quite restricted. This condition has led to efforts toward reducing the size and changing the shape of such components and the present invention constitutes a step in this direction. Additionally, much effort has been expended toward simplifying the construction, assembly and operation of these components and the associated parts with a view toward reducing costs. Here again the instant invention represents a substantial advance. Thus, it has heretofore been deemed necessary to incorporate in the control valve component of the power steering apparatus means whereby the working pressure is applied as a resistance to displacement of the movable component of the valve to the end of creating an "artificial feel" at the steering wheel. In such prior constructions, the fluid resistance is normally supplemented by the incorporation in the "feel" chamber or chambers of one or more centering springs which require adjustment at assembly and complicate the assembly operation. Where centering springs have been used alone without means providing a fluid resistance to displacement of the valve, the operation of the gears is unsatisfactory because at speeds above about 30 m.p.h. the steering is accomplished mechanically without compression of the springs and the transition to power steering as the speed of the vehicle decreases is so abrupt that the operator has the feeling that the steering function is being taken away from him. A feature of the present invention resides in the fact that the need for a feel chamber is dispensed with, yet there is no transition point sensible to the average operator.

Figure 5:
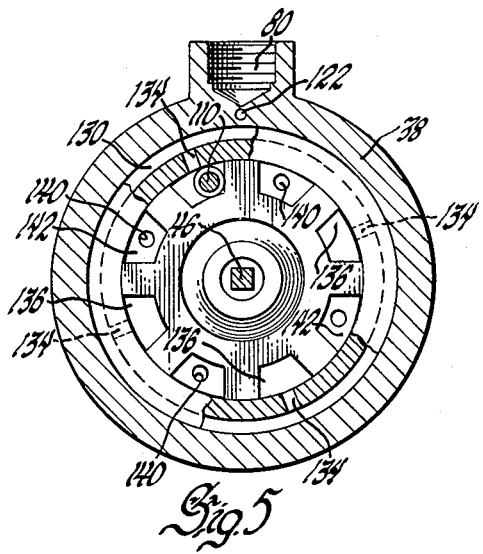
Figure 6:
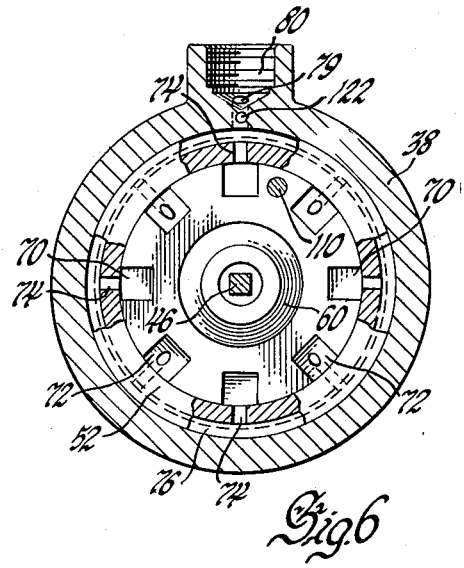

The principal objects of the invention are believed clear from the foregoing. A corollary object is to provide a control valve for the purpose indicated which is characterized in operation by rotary rather than axial movement. Other objects of the invention will be apparent from the following description of a preferred embodiment thereof. The description will proceed with reference to the accompanying drawings wherein:

FIGURE 1 is a view in which the principal parts appear in longitudinal section;
FIGURE 2 is a section on the line 2—2 in FIGURE 1;
FIGURE 3 is a section on the line 3—3 in FIGURE 1;
FIGURE 4 illustrates a modification;
FIGURE 5 is a section on the line 5—5 in FIGURE 4; and
FIGURE 6 is a section on the line 6—6 in FIGURE 4.

Referring first to FIGURE 1, the numeral 10 denotes a fluid motor, including a cylinder 12 housing a piston 14. The latter is recessed at 16 to accommodate the single tooth 18 of a pitman-operating shaft 20. It will be understood that the pitman (not shown) operated by shaft 20 provides the connection between the illustrated gear and the steering linkage of the vehicle to which the gear is applied.

Piston 14 has a bore 22 for the accommodation of a worm 24. A train of balls 26 operably interconnects the worm and the piston, which is internally helically grooved in a manner complementary to the worm groove. The balls 26 recirculate through a transfer tube 30.

Worm 24 is integral with a valve element 34 confined with a coacting element 36 in a housing 38 fixedly connected to the cylinder 12. The valve arrangement includes a plate 40 having shouldering engagement with the cylinder 12 and the housing 38.

Valve element 36 has integral therewith a shaft portion 42 which is secured to the steering shaft 44 so as to turn therewith. Such element has a central bore, closed by a plug 43, in which is confined a torsion bar 46 connected to the element 36 at 48 and to the element 34 at 50. A pair of sleeves 52, 52' surrounds the elements 34 and 36 and act both as bushings and as fluid transfer members.

The shaft portion 42 of the element 36 is surrounded by an adjusting nut 54 threaded into the housing 38 and secured in place by a locking ring 56. Nut 54 preloads thrust bearings 58, 60 and 62 located, respectively, between the outer annular face of the element 36 and the nut, between the elements 34 and 36 and between element 34 and the plate 40. Such plate is recessed in the manner of the nut 54 for the accommodation of the bearings 62. A seal 64 surrounding portion 42 of element 36 prevents escape of fluid from the body of the valve and also serves in the confinement of the bearings 66 in which the portion 42 turns.

Going now to FIGURE 3, it will be noted that the valve element 36 has in its inner face a plurality of pockets 70 and 72, these being formed to extend to the circumference of the face. Pockets 70 of which two appear in FIGURE 1 communicate via short radial passages 74 with an annular groove 76 in sleeve member 52'. The groove 76 will be seen as open via a short passage 79 to the inlet port 80 in housing 38.

Pockets 72, formed in the inner face of the valve element 36, communicate via passages 82 with a chamber 84 (FIGURE 1) which opens to a port 88 in the housing 38, this port being an exhaust port.

It will be understood that an installation incorporating the gear herein will include a suitable pump, the discharge side of which is connected to the port 80, and a reservoir from which the pump draws and to which fluid is exhausted via the port 88.

Valve element 34 has in the inner face thereof a plurality of pockets 90 and 92 delineated by lands 94. Pockets 90 open via short radial passages 96 to an annular groove 98 formed in the sleeve 52. Such groove, as shown in FIGURE 1, has connection with the lower or leftward chamber 100 of the motor 10. Pockets 92 communicate via passages 102 with an annular chamber 104 located between the outer face of the element 34 and the plate 40. The latter has therein a drilled passage 106 opening to the upper or rightward chamber 108 of the motor 10.

With elements 34 and 36 centered, lands 94 of element 34 are disposed centrally over the pockets in the element 36. Fluid flow, however, is permitted from the pockets 70 past the lands into the pockets 90 and 92 and from the latter pockets to the exhaust pockets 72, this by reason of the fact that the lands are of slightly lesser width than the pockets. Thus, the valve constituted of the elements 34 and 36 is an "open-center" valve, i.e., with the valve parts centered or in neutral position, fluid circulates freely through port 80 and out port 88 against the static pressure of the fluid in the motor chambers 100 and 108. On displacement of element 36 relative to element 34, the flow of the pressure fluid entering the pockets 70 via passages 74, the annular groove 76 and the passage 79, is substantially or completely restricted (depending on the steering resistance) to one end or the other of the power cylinder 12 as determined by the direction of the displacement. Flow to the left end of the cylinder follows the route of pockets 90, radial passages 96, annular groove 98 and the conduit (FIGURE 1) extraneous of the assembly to which the annular groove 98 opens. Flow to the right end of the cylinder 12 follows the course of pockets 92, passages 102, annular chamber 104 and passage 106.

With the fluid flow restricted to one end of the cylinder, the other end thereof is, of course, open to the exhaust port 88. Assuming, for example, that the flow of pressure fluid is restricted to the left end of the cylinder, the right end thereof exhausts its fluid via the passages just described, the exhaust fluid, however, being caused to enter the pockets 72 in element 36 rather than pockets 70, this by reason of the displaced condition of such element. Pockets 72, as previously explained, communicate with the exhaust port 88 via passages 82 and the exhaust chamber 84.

A pin 110, the purpose of which will soon become apparent, extends from the inner face of element 36 and is received loosely in a hole 112 in the inner face of element 34.

Operation

Torsion bar 46, unlike the coil springs employed in conventional power steering gears, is under no preload and, consequently, immediately begins to twist on the imposition of the steering effort at the shaft 44. Such twisting results in rotary movement of the valve element 36 relative to the element 34, the relative motion being permitted by the clearance between the periphery of the pin 110 and the annular wall of the hole 112. This pin connection represents a safety device since, in the event of a hydraulic failure, the vehicle may be steered manually through the two valve parts.

The rotation of element 36 relative to element 34 changes the neutral flow, above described, so that a pressure differential is created across the power piston 14 in favor of one or the other of the chambers 100 and 108, depending upon the direction element 36 is turned. Assuming a right turn, for example, the clockwise rotation of the element 36 will result in pressurization of the lower chamber 100 of the motor. This, of course, causes rightward displacement of the piston 14 and counterclockwise turning of the pitman-operating shaft 20.

The valve element 34 being integral with the worm 24 seeks constantly to catch up, so to speak, with the manually-rotated element 36. As a consequence, cessation of the effort at the steering wheel is marked by immediate centering of the elements with no retardation of the forces which bring about reversal of the steering parts.

The degree of twisting or deflection of the torsion bar 46 as the steering action proceeds is determined by the load (steering resistance) and is essentially a straight-line function. Thus, substantially twice as much effort is required at the steering wheel to twist the bar two degrees as must be imposed to twist it one degree. The actual rate of the bar, of course, is set by control of the diameter and/or length thereof. In a preferred design, a rate of the order of 9 inch-pounds per degree of deflection obtains.

Going now to the modification illustrated by FIGURES 4–6, wherein like numerals denote like parts in the other figures, there will be seen provided a pressure-responsive plate 120 having communication with the pressure port 80 via a drilled passage 122. In view of such passage, the pressure in the chamber 124 is always the system pressure. Accordingly, the plate 120 tends to become displaced rightwardly to load the bearings 58, 60 and 62 and to further the close face-to-face relation of the elements 34 and 36. Passages 126 and 128 serve, of course, in the lubrication of bearings 62 and 58, respectively.

By reason of the pressure plate 120 the upper motor chamber 108 cannot be connected with the control valve via a passage in plate 40a. Therefore, there is provided in sleeve 52 a pair of annular grooves 130 and 132. Groove 130 is connected via short radial passages 134 in sleeve 52 with pockets 136 formed in the inner face of the valve element 34, while annular groove 132 is connected via passages 140 with pockets 142 formed in the opposing face of the element 34.

The pockets and passages in the inner face of the valve element 36 are identical with those shown in FIGURE 3 and serve as has been described.

What is claimed is:

1. In a fluid-operated servo device including an input member, an output member, and a fluid motor operably connected to said output member, the combination, within a housing, of a pair of rotary elements in close face-to-face relation through which fluid flow to and from said motor is controlled, one of said elements having in its opposing face a pair of pockets communicating respectively with a pressure passage and an exhaust passage in said housing, the other of said elements having in its opposing face a pocket open to a passage therein communicating with said motor, said last pocket being connectable on relative rotation of said elements with either one of said first pockets to the exclusion of the other, said one element being connected to said input member for movement therewith and being interconnected with said other element through a torsion member which in operation distorts to permit the said relative rotation, said other element being operably connected to said output member.

2. In a fluid-operated servo device including an input member, an output member, and a fluid motor operably connected to said output member, the combination, within a housing, of a pair of rotary elements in close face-to-face relation through which fluid flow to and from said motor is controlled, one of said elements being connected to said input member and having in its opposing face at the circumference thereof a pair of pockets communicating respectively with a pressure passage and an exhaust passage in said housing, the other of said elements being operably connected to said output member and having in its opposing face at the circumference thereof a pocket open to a passage therein communicating with said motor, said last pocket being connectable on relative rotation of said elements with either one of said first pockets to the exclusion of the other, a torsion member interconnecting said elements which in operation distorts to permit the said relative rotation, bearing means interposed between said elements radially inwardly of said pockets, bearing means at the outer face of each of said elements and thrust means carried by said housing for preloading said bearings.

3. In a fluid-operated servo device including an input member, an output member, and a fluid motor operably connected to said output member, the combination, within a housing, of a pair of rotary elements in close face-to-face relation through which fluid flow to and from said motor is controlled, one of said elements being connected to said input member and having in its opposing face at the circumference thereof a pair of pockets communicating respectively with a pressure passage and an exhaust passage in said housing, the other of said elements being operably connected to said output member and having in its opposing face at the circumference thereof a pocket open to a passage therein communicating with said motor, said last pocket being connectable on relative rotation of said elements with either one of said first pockets to the exclusion of the other, a torsion member interconnecting said elements which in operation distorts to permit the said relative rotation, a pin carried by one of said elements and fitting loosely in a hole formed in the other element to set the limits of the relative rotation, bearing means interposed between said elements radially inwardly of said pockets, bearing means at the outer face of each of said elements and thrust means carried by said housing for preloading said bearings.

4. In a fluid-operated servo device including an input member, an output member, and a fluid motor operably connected to said output member, the combination, within a housing, of a pair of rotary elements in close face-to-face relation through which fluid flow to and from said motor is controlled, one of said elements being connected to said input member for actuation thereby and having in its opposing face a pair of pockets communicating respectively with a pressure passage and an exhaust passage in said housing, the other of said elements being operably connected to said output member and having in its opposing face a pocket open to a passage therein communicating with said motor, said last pocket being connectable on relative rotation of said elements with either one of said first pockets to the exclusion of the other, a torsion member interconnecting said elements which in operation distorts to permit the said relative rotation and pressure-responsive means communicating with said pressure passage and acting to maintain said elements in the said close face-to-face relation.

5. In a fluid-operated servo device including an input member, an output member, and a fluid motor operably connected to said output member, the combination, within a housing, of a pair of rotary elements in close face-to-face relation through which fluid flow to and from said motor is controlled, one of said elements being connected to said input member and having in its opposing face at the circumference thereof a pair of pockets communicating respectively with a pressure passage and an exhaust passage in said housing, the other of said elements being operably connected to said output member and having in its opposing face at the circumference thereof a pocket open to a passage therein communicating with said motor, said last pocket being connectable on relative rotation of said elements with either one of said first pockets to the exclusion of the other, a torsion member interconnecting said elements which in operation distorts to permit the said relative rotation, a pin carried by one of said elements and fitting loosely in a hole formed in the other element to set the limits of the relative rotation, bearing means interposed between said elements radially inwardly of said pockets, bearing means at the outer face of each of said elements, thrust means carried by said housing for preloading said bearings and pressure-responsive means communicating with said pressure passage and acting to further the close face-to-face relation of said elements.

6. In a fluid-operated servo device including an input member, an output member, and a double-acting fluid motor comprising a piston operably connected to said output member, said piston having a helically grooved bore at one end thereof, the combination, within a housing, of a pair of rotary elements in close face-to-face relation through which fluid flow to and from said motor is controlled, one of said elements being connected to said input member for actuation thereby and having in its opposing face at the circumference thereof a first pair of pockets communicating with a pressure passage in said housing and a second pair of pockets communicating with an exhaust passage in said housing, the other of said elements being operably connected to said output member through a worm accommodated in the said bore in said piston and operably connected to said piston via a ball train, said other element having in its opposing face at the circumference thereof a pair of pockets each open to a passage therein communicating with said motor, either of said last pockets on relative rotation of said elements being connectable through a pocket in said one element to one of said pressure passage and said exhaust passage to the exclusion of the other, a torsion member interconnecting said elements which in operation distorts to permit the said relative rotation, a pin carried by one of said elements and fitting loosely in a hole formed in the other element to set the limits of the relative rotation, bearing means interposed between said elements radially inwardly of said pockets, bearing means at the outer face of each of said elements and means carried by said housing for preloading said bearings.

7. The combination according to claim 6 comprising additionally pressure-responsive means connected to said pressure passage and acting to further the close face-to-face relation of said elements.

8. In a fluid-operated servo device including an input member, an output member, and a fluid motor operably connected to said output member, the combination, within a housing, of a pair of rotary elements in close face-to-face relation through which fluid flow to and from said motor is controlled, one of said elements being connected to said input member and having in its opposing face at the circumference thereof a pair of pockets communicating respectively with a pressure passage and an exhaust passage in said housing, the other of said elements being operably connected to said output member and having in its opposing face at the circumference thereof a pocket open to a passage therein communicating with said motor, said last pocket being connectable on relative rotation of said elements with either one of said first pockets to the exclusion of the other, yieldable means interconnecting said elements and tending to maintain the same in a centered relation, bearing means interposed between said elements radially inwardly of said pockets, bearing means at the outer face of each of said elements and thrust means carried by said housing for preloading said bearings.

9. In a fluid-operated servo device including an input member, an output member, and a double-acting fluid motor comprising a piston operably connected to said output member, said piston having a helically grooved bore at one end thereof, the combination, within a housing, of a pair of rotary elements in close face-to-face relation through which fluid flow to and from said motor is controlled, one of said elements being connected to said input member for actuation thereby and having in its opposing face at the circumference thereof a first pair of pockets communicating with a pressure passage in said housing and a second pair of pockets communicating with an exhaust passage in said housing, the other of said elements being operably connected to said output member through a worm accommodated in the said bore in said piston and operably connected to said piston via a ball train, said other element having in its opposing face at the circumference thereof a pair of pockets each open to a passage therein communicating with said motor, either of said last pockets on relative rotation of said elements being connectable through a pocket in said one element to one of said pressure passage and said exhaust passage to the exclusion of the other, yieldable means interconnecting said elements and tending to maintain the same in a centered relation, a pin carried by one of said elements and fitting loosely in a hole formed in the other element to set the limits of the relative rotation, bearing means interposed between said elements radially inwardly of said pockets, bearing means at the outer face of each of said elements and means carried by said housing for preloading said bearings.

10. In a fluid-operated servo device including an input member, an output member, and a fluid motor operably connected to said output member, the combination, within a housing, of a pair of rotary elements in opposing face-to-face relation through which fluid flow to and from said motor is controlled, one of said elements being operably connected to one of said input member and said output member and having in its opposing face a pair of pockets communicating respectively with a pressure passage and an exhaust passage in said housing, the other of said elements being operably connected to the other of said input member and said output member and having in its opposing face a pocket open to a passage therein communicating with said motor, said last pocket being connectable on relative rotation of said elements with either one of said first pockets to the exclusion of the other, the element connected to said input member being interconnected with the other element through a torsion member which in operation distorts to permit the said relative rotation.

References Cited in the file of this patent

UNITED STATES PATENTS

| | | |
|---|---|---|
| 1,947,973 | Davis | Feb. 20, 1934 |
| 1,966,537 | Binckley | July 17, 1934 |
| 2,349,614 | Tucker et al. | May 23, 1944 |
| 2,308,369 | Nix | July 10, 1945 |
| 2,427,340 | Allison | Sept. 16, 1947 |
| 2,542,769 | Griffey | Feb. 20, 1951 |
| 2,599,159 | Breedlove | June 3, 1952 |
| 2,605,854 | Macduff | Aug. 5, 1952 |
| 2,640,322 | Puerner | June 2, 1953 |
| 2,688,258 | Haynes et al. | Sept. 7, 1954 |